United States Patent [19]
Roba

[11] Patent Number: 4,659,354
[45] Date of Patent: Apr. 21, 1987

[54] METHOD OF PRODUCING SILICA OPTICAL FIBRES WITH REDUCED VOLUME AND SURFACE DEFECTS

[75] Inventor: Giacomo Roba, Cogoleto, Italy

[73] Assignee: CSELT-Centro Studi Laboratori Telecomunicazioni S.p.A., Turin, Italy

[21] Appl. No.: 817,025

[22] Filed: Jan. 8, 1986

[30] Foreign Application Priority Data

Mar. 18, 1985 [IT] Italy .............................. 67265 A/85

[51] Int. Cl.⁴ ............................................. C03C 25/02
[52] U.S. Cl. .................................... 65/3.12; 65/3.11; 65/60.8
[58] Field of Search .................. 65/2, 3.12, 3.11, 60.8, 65/60.6

[56] References Cited

FOREIGN PATENT DOCUMENTS 3340640 5/1985 Fed. Rep. of Germany ....... 65/3.12
59-162149 9/1984 Japan ..................................... 65/60.8

*Primary Examiner*—Robert Lindsay
*Attorney, Agent, or Firm*—Karl F. Ross; Herbert Dubno

[57] ABSTRACT

The method allows surface defect reduction in silica optical-fibers by enriching the external layer by silica bonded carbon atoms within the silica lattice: $SiC.SiO_2$. Carbon is obtained from chemical reaction directly during the drawing step. Volume defects are reduced by rapidly cooling the fiber structure heated up to vitreous transition temperature.

1 Claim, 1 Drawing Figure

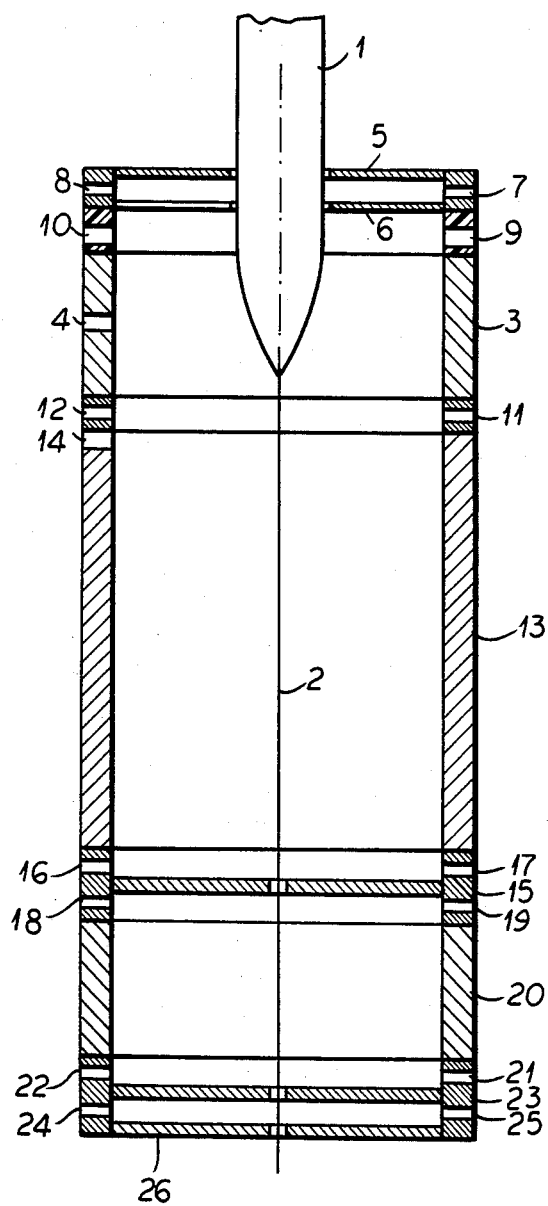

METHOD OF PRODUCING SILICA OPTICAL FIBRES WITH REDUCED VOLUME AND SURFACE DEFECTS

FIELD OF THE INVENTION

The present invention relates to a method of manufacturing transmission media for telecommunications systems using light radiations and, more particularly, it relates to a method of and to an apparatus for reducing surface and volume defects in silica optical fibers.

BACKGROUND OF THE INVENTION

During the drawing of optical fibers both surface and volume defects are generated in the optical fiber.

In the former case the defects consist in superficial micro-fractures of different depth which according to their type and density affect more or less seriously the mechanical properties of resistance to traction and dynamic fatigue of the fiber.

In the latter case they consist in lattice defects such as micro-crystals, bond defects, etc, which give rise to the formation of color centers, i.e. zones in which the optical radiation is absorbed according to a law dependent on the wavelength. These are generally gaussian curves with a maximum in the ultraviolet band. In addition, the volume defects referred to above raise the value of the Rayleigh scattering coefficient, and hence the entire attenuation curve. Finally, volume defects increase the network reactivity with polluting agents, such as molecular hydrogen, etc, which can diffuse inside giving rise to new absorption zones.

In Proc. Optical Fiber Communication Washington D.C. Mar. 6–8, 1979, pages 74, 75 the paper entitled *"Improved fatigue resistance of high-strenght optical fibers"* by R. Hiskes, describes an attempt at eliminating at least surface defects by directly applying on the fiber, during drawing and prior to coating it with resin, a thin layer of ceramic material.

However surface defects are not completely avoided, as the process cannot take place at the high temperatures, at which fiber deformations might take place and hence the adherence between the applied ceramic layer and the fiber is poor. Besides, since the deposition is made directly on the fiber, the drawing speed is slowed down and manufacturing times are increased.

These disadvantages are overcome by a method of reducing volume and surface defects in silica optical fibers, provided by the present invention, by which surface defects of vitreous silica fibers can be avoided by enriching the surface with a compound which changes its thermomechanical properties preventing micro-fractures, without perturbations in the chemical equilibrium of material. In addition, by small changes to the used apparatus volume defects can be overcome, obtaining a fiber whose vitreous structure better approaches an ideal.

SUMMARY OF THE INVENTION

The present invention provides a method of reducing volume and surface defects in silica optical-fibers, wherein characterized in that during the drawing the surface of transition zone of the preform is chemically activated by a reducing atmosphere and a layer of carbon particles under nascent state is deposited, the carbon particles being then induced to diffuse by a temperature equal to glass melting temperature and to react with silica according to the equation $$Si.[SiO_2] + C \rightarrow Sic.[SiO_2]$$

where the presence of square brackets means a prevailing silica presence in the preform material, and also characterized in that the just-drawn optical fiber is raised to a temperature equal to or slightly higher than the vitreous transition temperature and then is rapidly cooled.

The method consists in generating inside the drawing furnace a reducing atmosphere so as to partly activate the surface of the transition zone of the preform, i.e. the zone where the diameter becomes equal to the fiber diameter.

Simultaneously nascent-state carbon particles are deposited on the upper preform zone, thanks to the thermal-gradient presence.

As the preform enters the drawing furnace, the deposited carbon layer meets thermal conditions allowing its weak diffusion inside the material and, in addition, since the surface is activated by the reducing atmosphere, it can react with the material giving rise to a mixed compound with a greater density than silica.

Carbon as well as hydrogen can be used as reducing agents. Surface activating reactions are as follows:

$$SiO_2.[SiO_2] + 2H_2 \rightarrow Si.[SiO_2] + 2H_2O$$

$$SiO_2.[SiO_2] + 2C \rightarrow Si.[SiO_2] + 2CO$$

where the symbols in square brackets indicate that the material chiefly consists of silica, with a final result of oxygen reduction.

The surface activated in presence of nascent carbon can give rise to a second reaction, which takes always place with silica in excess and still at drawing temperature ($\sim 2000°$ C.):

$$Si.[SiO_2] + C \rightarrow SiC.[SiO_2]$$

The result of this second reaction is the partial occupation by carbon atoms of bonds activated by reduction.

The final material has a more compact and uniform structure and presents a more regular surface; as a consequence, its surface properties render it less liable to micro-fractures. Besides, since the whole process is based on diffusive phenomena, the material characteristics vary gradually from the inside towards the outside, thus obtaining a less critical structure from the mechanical point of view.

The fact that the operation is carried out at high temperatures, about 2000° C., allows the phenomena above and prevents any discontinuity in the material.

To improve material properties from standpoint of volume defects, a rapid-cooling is necessary, i.e. a very high dT/dt (T=temperature; t=time), of the just produced fiber, so as to freeze the molecular state under the conditions of thermal chaos which the material has at high temperature, to reproduce the amorphous structure typical of vitreous state. The temperature at which glass formation takes place is the vitreous transition temperature Tg. For an ideal glass, this temperature directly determines also the value of the Rayleigh scattering coefficient, and hence optical attenuation properties.

Usually the fiber rapidly cools as an effect of its reduced thermal capacity (owing to small dimensions), passing from drawing temperature to ambient temperature. Nevertheless, the drawing temperature is generally very high, as it corresponds to the softening temperature of the material; more precisely it is about twice as high as the vitreous transition temperature, which for pure silica is equal to 1100° C. Operating in this way, the cooled material can keep traces of its condition at excessive temperature and hence residual attenuation. Thus the value of Rayleigh scattering coefficient can be higher than the optimal one. The method of the invention provides a passage from softening temperature to ambient temperature through an intermediate step at a temperature slightly higher, for safety purposes, than that of vitreous transition Tg.

The final product, having been frozen under the best conditions for the glass manufacturing, is free from volume defects.

BRIEF DESCRIPTION OF THE DRAWING

The sole FIGURE shows an apparatus for carrying out the method in diagrammatic section.

SPECIFIC DESCRIPTION

The drawing shows the preform 1 wherefrom optical fiber 2 is drawn. The glass softening temperature, of about 2000° C., is obtained by a furnace 3, equipped with a silica window 4, through which the temperature can be optically read. The preform enters the furnace through a pair of disks 5 and 6, with central holes, between which an inert gas e.g. $N_2$ or Ar, is sent through inlets 7 and 8. The flow of this gas, drawn by inlets 9 and 10 made in the chamber below, separates the high-temperature zone from the zone outside, communicating with one another through gaps present between preform 1 and the disks 5, 6 with central holes.

Methane ($CH_4$) is injected through inlets 11 and 12; thanks to high temperature present in furnace 3, it decomposes into $C_2$ and $H_2$.

Nascent state carbon ($C_2$) and an atmosphere rich in hydrogen with reducing properties, are thus obtained.

$C_2$ and $H_2$ flow impinges upon the preform, where $C_2$ deposits according to normal thermophoretic phenomena and the excess reducing gas is sucked through inlets 9 and 10.

The just-obtained fiber traverses a second furnace 13, capable of eusuring at its inside a slightly higher temperature than vitreous transition temperature, e.g. 1120° C. Also this furnace is provided with a window 14 through which fiber diameter can be read and is closed at the bottom by a disk 15 with central hole. An inert gas is injected through inlets 16 and 17 inside the furnace 13. This gas is preheated to 1120° C. and has the task of sealing the gap present between disk 15 and optical fiber 2.

After traversing disk 15, the fiber enters a chamber at a low temperature between +20° C. and −50° C., delimited by a conditioner 20 and a pair of disks 23 and 26 with central holes. A cold inert gas is injected into the chamber through inlets 18 and 19 and is then sucked away through inlets 22 and 21.

An inert gas is injected also through inlets 24 and 25 with the task of sealing the gap comprised between disk 26 and the fiber.

It is clear that what described has been given by way of non limiting example. Modifications and variations are possible without going out of the scope of the invention.

I claim:

1. A method of producing an optical fiber with reduced volume and surface defects which comprises the steps of:
   (a) heating a silica preform to a glass drawing temperature and drawing an optical fiber therefrom at a transition zone between the fiber and the preform;
   (b) chemically activating said transition zone concurrently with the drawing of the fiber and depositing carbon in a nascent state thereon whereby carbon diffuses into said fiber and reacts therewith in accordance with the relation:

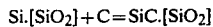
   $Si.[SiO_2] + C = SiC.[SiO_2]$ and the square brackets mean a prevailing silica pressure in the preform;
   (c) immediately thereafter heating the drawn fiber to a temperature at least equal to but not substantially greater than the vitreous transition temperature; and
   (d) thereafter rapidly cooling said fiber.

* * * * *